United States Patent [19]

Shay, Jr.

[11] 4,427,221
[45] Jan. 24, 1984

[54] DRILL BIT NOZZLE RETENTION AND ALIGNMENT SYSTEM

[75] Inventor: William Shay, Jr., Wharton, Tex.

[73] Assignee: Reed Rock Bit Company, Houston, Tex.

[21] Appl. No.: 310,574

[22] Filed: Oct. 13, 1981

[51] Int. Cl.³ ............................................. F16L 37/14
[52] U.S. Cl. .................................. 285/305; 285/184; 403/14; 175/340; 29/439
[58] Field of Search ...................... 285/305, 276, 184; 403/13, 14; 175/340, 393; 29/439, 526 R

[56] References Cited

U.S. PATENT DOCUMENTS

| | | | |
|---|---|---|---|
| 3,084,751 | 4/1963 | Scarborough | 285/305 X |
| 3,220,754 | 11/1965 | Mori | 285/305 |
| 4,019,543 | 4/1977 | Craig | 175/340 |
| 4,293,148 | 10/1981 | Milberger | 285/305 X |

Primary Examiner—Dave W. Arola
Attorney, Agent, or Firm—Michael J. Caddell

[57] ABSTRACT

A nozzle retention system is disclosed which serves to retain a jet nozzle in a drilling bit and also align the nozzle with respect to the bit cutters, said system utilizing a deformable pin and interacting channels in the nozzle and the bit nozzle bore.

7 Claims, 4 Drawing Figures

DRILL BIT NOZZLE RETENTION AND ALIGNMENT SYSTEM

BACKGROUND OF THE INVENTION

The present invention generally relates to fluid jet nozzles on downhole drilling bits and more particularly involves a retention system for locating and retaining a directed jet nozzle in a rolling cutter drill bit.

In the rolling cutter drill bit industry, there are generally several kinds of fluid-cooled rolling cutter bits. Two of the major types of bits are the regular fluid-cooled bit and the "jet" nozzle bit. The "jet" nozzle bit is the type utilizing one or more nozzles located in the bit body or the lugs of the bit to provide a relatively high-pressure, high-velocity flow of cooling and cleaning fluid into the borehole in the area in which the drill bit is cutting rock.

In a copending application, U.S. Ser. No. 241,909, filed Mar. 9, 1981, by Robert H. Slaughter for "Mounting Means for Drill Bit Directed Nozzles"; which application is assigned to the same assignee as is the present invention, which application is herein incorporated by reference, a jet nozzle rolling cutter drill bit is disclosed having directed nozzles oriented in a particularly advantageous position with respect to the rolling cutters. In the aforementioned copending application, it is disclosed how this particular orientation of the jet nozzles with respect to the rolling cutters provides a more efficient cutting action on the borehole and a more effective cleaning of the cutters to prevent balling and loss of cutter penetration into the formation. The aforementioned copending application, while providing a significant improvement over the prior art, suffers from one disadvantage in that the system of aligning the nozzles in their proper orientation with respect to the cutters, is relatively cumbersome and difficult to manufacture. Also, the alignment system therein is separate and distinct from the retention system and adds further expense to the manufacture of the bit.

In addition to the alignment system disclosed in said copending application, there is an alignment system disclosed in U.S. Pat. No. 3,084,751 dated Apr. 9, 1963 to W. E. Scarborough for a nozzle retention system in a common jet nozzle bit. The Scarborough bit does not utilize the directed nozzles, but merely discloses nozzles directed downward at the borehole face between the rolling cutters. Likewise, the Scarborough disclosure, while teaching the use of a deformable pin in coacting grooves between the nozzle and the body, has no means for aligning the nozzle with respect to the cutters since the Scarborough bit does not use oriented nozzles.

The present invention overcomes the disadvantages of the prior devices and provides a system which features both the retention and alignment of oriented nozzles in a rolling cutter bit.

DESCRIPTION OF THE PREFERRED EMBODIMENTS

Figure 1:
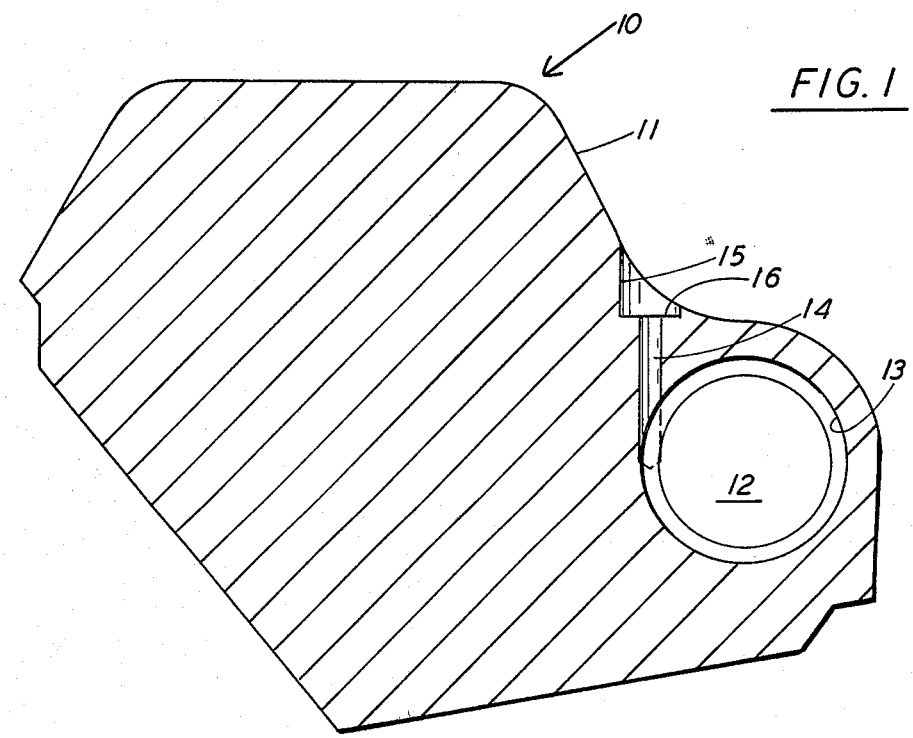
FIG. 1 is a cross-section of the lug portion of a bit taken through the nozzle bore area.

Referring now to the drawings, and more particularly to FIG. 1, a cross-sectional view of a portion of a lug is disclosed, showing the nozzle bore passage and the pin retention channel. The lug is similar to that disclosed in the aforementioned copending application U.S. Ser. No. 241,909 filed Mar. 9, 1981 by Robert H. Slaughter for Mounting Means for Drill Bit Directed Nozzles which copending application is herein incorporated by reference in its entirety.

The bit disclosed in the incorporated patent comprises a bit body having one or more downwardly extending lug members formed thereon. The bit body has one or more bore passages containing extended nozzles projecting downwardly from the body. The nozzles each have jet passages exiting from the lower ends thereof oriented towards the cutters in a predetermined orientation consisting of a particularly advantageous angle with respect to the vertical axis of the bit. It is important that the orientation of the jet passages in the nozzles be correct when the bit is assembled and run into the borehole. This is accomplished by keyway locking means in the incorporated patent application. In the present invention in FIG. 1, the bit 10, comprising body portion 11, has been cross-sectioned to illustrate the nozzle bore 12 therein. Nozzle bore 12 is of generally circular section and has an annular groove 13 formed around the periphery thereof inside body 11. The tangential pin channel 14 is bored from the exterior of the body to intersect groove 13. A counterbore or opening 15 is formed at the exterior end of channel 14 to provide an enlarged seating surface 16 therearound.

Figure 2:
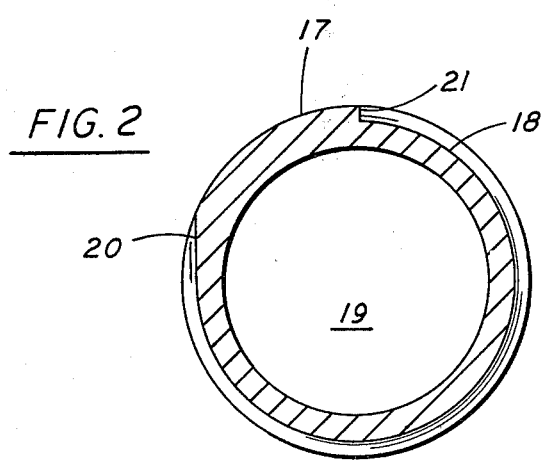
FIG. 2 is a cross-sectional illustration of a nozzle looking in the axial direction.

Referring to FIG. 2, a generally cylindrical jet nozzle 17 is provided having an annular groove 18 extending substantially around the external periphery thereof. The grooves 13 and 18 cooperate to form a generally annular recess in the nozzle and nozzle bore, when the nozzle is in the nozzle bore and the grooves are in register. The nozzle has an internal bore passage 19 formed therethrough. Groove 18 intersects the outer surface of nozzle 17 on a tangent and forms a relatively flat surface 20 for a short distance there across thereby forming lock means as described more fully hereafter. At the other end of groove 18, there is a perpendicular stop portion or end wall 21.

Figure 3:
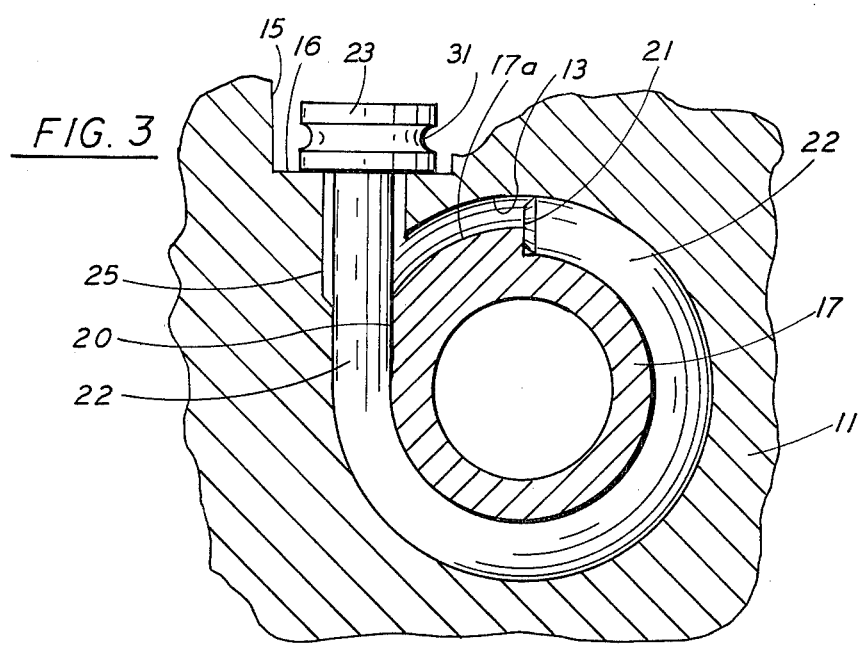
FIG. 3 is a cross-sectional view showing a portion of a lug with the nozzle held in place by the retaining pin.
Figure 4:
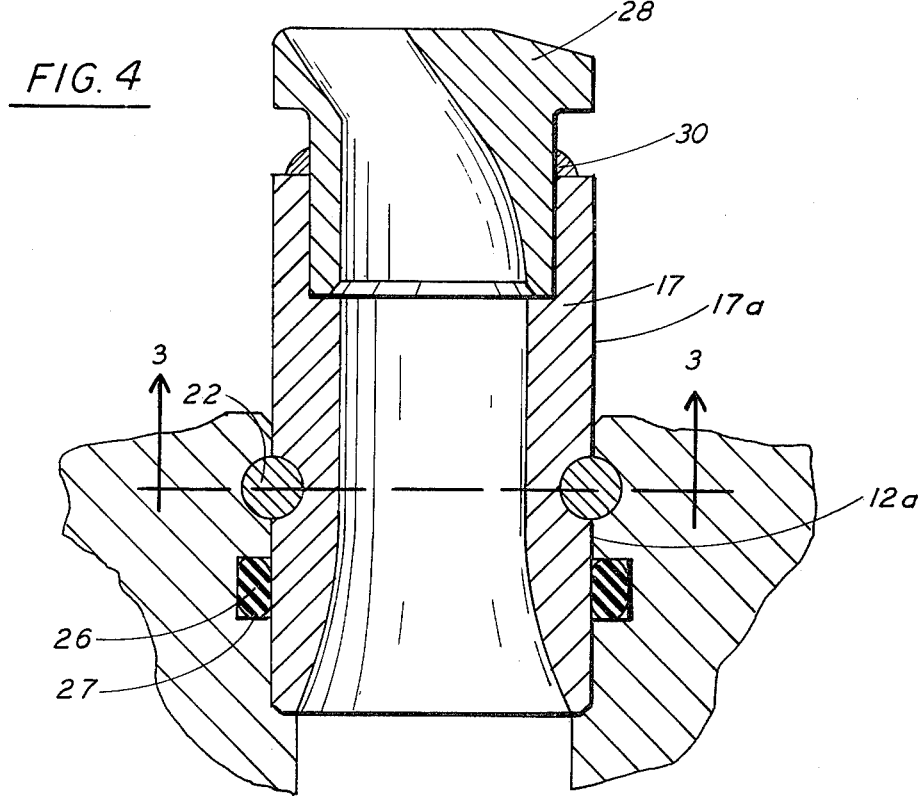
FIG. 4 is a side cross-sectional view of a nozzle assembly secured in a rock bit lug section.

Referring now to FIGS. 3 and 4, a diagrammatic illustration of the jet nozzle 17 located in lug body 11 is illustrated. The nozzle 17 is generally sized at its outer diameter 17a for relatively snug fitting relationship in the inner diameter 12a of nozzle bore 12. The nozzle 17 is located within bore 12 such that the annular groove 18 of the nozzle lies in alignment with annular groove 13 in bore 12. End wall 21 preferably is located originally 90 degrees counter-clockwise from its position illustrated in FIG. 3. A generally cylindrical elongated pin 22, having a shank of predetermined length of a relatively soft, plastically deformable metal composition and an enlarged abutment head portion 23 at one end thereof, is placed in channel 14 and forced inward to abut shoulder 21 on nozzle 17. As pin 22 moves inward through the coacting grooves 13, 18 and 18, it abuts end wall 21 and forces rotation of nozzle 17 in bore 12. As the pin continues to move inward, it begins to curve to conform to the annular circular configuration of the annular recess. After the nozzle has rotated a predetermined distance, the flat portion 20 is rotated around and abuts the upper shank portion of pin 22. This provides a positive lock or stop in the rotation of nozzle 17 in bore 12 and as predetermined earlier, gives proper nozzle orientation (i.e., angular position) of the directed nozzle in the drilling bit for directing the drilling fluid in a predetermined direction. In addition to the positive action of shoulder 20 on pin 22, the head 23 of the pin 22 can be located at exactly the proper length, so that as shoulder 23 will also abut the shoulder 16 of counterbore 15. The second smaller counterbore 25 may be provided to make insertion of pin 22 into the coacting annular channels a little bit easier.

FIG. 4 is a side cross-sectional view of the nozzle 17 in place in bit body 11. In the drawing, the pin 22 has been inserted to a proper length and serves to retain or secure the nozzle in the bit body and also to maintain proper orientation (i.e., angular position) of the nozzle. An elastomeric annular seal 26 can be provided in an annular groove 27 formed in nozzle bore 12 to provide sealing against fluid or detritus into or out of bore 12 past nozzle 17. The directed portion of nozzle 17 may be of a homogeneous material integrally formed with the nozzle body or may be a separately formed portion 28 as illustrated in FIG. 4. This may be formed of a material such as tungsten carbide, which is highly resistant to abrasion and may be formed in a circular or non-circular orientation with respect to body 17. In the figure, the directed jet passage 29 is formed at an angle to the longitudinal axis of nozzle 17 to provide the directed orientation of the emitted jet spray therefrom. The directed nozzle portion 28 may be secured in nozzle body 17 by means such as welding 30 or other retention means, such as snap rings or threads. The nozzle body 17 preferably is formed of a low-cost alloy such as carbon steel or other type of steel. The pin 22 is preferably formed of a maleable metal such as iron, which has very little elasticity but is maleable and ductile to be reformed in the circular shape required for retention in the annular grooves 18 and 13. Because of the low elasticity and the high ductility of the metal of pin 22, it serves to retain nozzle 12 in a very accurate orientation when it has been inserted to the proper depth in the annular channels. In addition to soft iron, other soft ferrous and nonferrous metals could be used as well as certain plastic materials to manufacture the pin 22.

When it is desirable to remove the nozzle 17 for replacement of the jet portion 28 or to substitute a new nozzle 17, the pin 22 is removed by grasping head 23 with pliers or other types of tools engaging the annular groove 31 formed in the head. Because of the soft nature of the metal of pin 22, it may be removed by pulling outward and deforming the pin enough to straighten it and pull it from the coacting annular grooves. Or, the pin can be rotated out by gripping the nozzle and turning it in the opposite direction, which is clockwise in FIG. 2. In addition, if it is desired, a soft metal such as aluminum or copper could be utilized to manufacture pin 22 such that if head 23 had corroded or broken off, the nozzle could be removed by shearing the retention pin 22 by applying upward or downward force on the nozzle body 17 sufficient to shear relatively soft metal.

Thus the present invention discloses a retention means for a directed jet nozzle in a rolling cutter drill bit having extended nozzles located therein. The retention system comprises a metal pin which engages complementary annular grooves formed in the bore passage and in the nozzle body. The groove in the nozzle body has an end wall abutment surface for engaging the end of the pin and for providing desirable alignment of the directed nozzle with respect to the bit body. It can be seen that by providing a combination retention and alignment system that improved alignment can be achieved with the system as well as economies in manufacturing the bits.

Although certain referred embodiments of the present invention have been herein described in order to provide an understanding of the general principles of the invention, it will be appreciated that various changes and innovations can be effected in the described drill bit nozzle retention system without departing from these principles. All modifications and changes are deemed to be embraced by the spirit and scope of the invention except as the same may be necessarily limited by the appended claims or reasonable equivalents thereof.

The embodiments of the invention in which an exclusive property or privilege is claimed and defined as follows:

1. A nozzle retention and alignment system for a rotary drill bit of the type adapted to direct drilling fluid under pressure in a predetermined direction against the formation to be drilled, the bit comprising a body having a nozzle bore therein of generally circular section, and a jet nozzle having a generally cylindrical portion adapted to be fitted in the nozzle bore, the nozzle having passaging therein for directing the drilling fluid to exit the nozzle in a stream at an angle to the central longitudinal axis of the nozzle; the retention system comprising:

a groove in the cylindrical portion of the nozzle extending at least partially therearound;

a groove in the interior surface of the nozzle bore extending at least partially therearound, said grooves cooperating to form a generally annular recess in the nozzle and nozzle bore when the nozzle is in the nozzle bore and the grooves are in register;

an opening in the bit body in communication with the groove in the nozzle bore;

a pin having a shank of predetermined length formed of plastically deformable material, said shank being adapted to extend through the opening in the bit body and into the annular recess for securing the nozzle in the nozzle bore against relative longitudinal movement, with the grooves therein in register; and stop means on the nozzle engageable by an end of the pin, whereby upon insertion of the pin into the recess, the pin engages the stop means and rotates the nozzle in the nozzle bore to a predetermined angular position in which the nozzle directs the drilling fluid in the predetermined direction and locking means for holding the nozzle against rotation when in its predetermined angular position.

2. A nozzle retention system as set forth in claim 1 wherein said grooves extend for substantially the entire periphery of the nozzle and the nozzle bore.

3. A nozzle retention system as set forth in claim 1 wherein the stop means comprises a wall at the end of the groove in the nozzle.

4. A nozzle retention system as set forth in claim 1 wherein the lock means comprises portions of the grooves in the nozzle and nozzle bore extending generally along a tangent of the circle defined by said annular recess.

5. A nozzle retention system as set forth in claim 4 wherein the pin has a head engageable with the bit body when the shank of the pin is fully inserted in the recess.

6. A method of retaining a generally cylindrical body in a bore of a larger body while aligning said cylindrical body rotationally with respect to said larger body, said method comprising:

forming an annular groove in the exterior of said generally cylindrical body;

forming a stop wall in said annular groove;

forming an annular groove in said bore arranged to align with said first annular groove;

placing a bore passage from the exterior of said larger body to a generally tangentially intersecting position with said aligned annular grooves;

locating said cylindrical body in said bore to align said annular grooves and to locate said stop wall in said bore passage in position to be abutted by a pin moving thereinto;

driving a bendable pin through said bore passage into abutment with said stop wall;

driving said pin further into said bore passage thereby rotating said cylindrical body and engaging said pin in retention position in said annular grooves;

providing stop means to prevent further entry of said pin when said cylindrical body is radially aligned in said larger body, and;

driving said pin into said bore passage until it stops, said stop means provision step comprising forming an abutment shoulder on said cylindrical body in said annular groove arranged to abut said pin after rotation of said cylindrical body to a predetermined desired position, thereby ceasing rotation of said cylindrical body.

7. The method of claim 6 wherein said stop means provision step comprises forming an enlarged head on said pin; said head having appreciably greater diameter than said bore passage and arranged to stop entry of said pin thereinto upon abutment with said larger body.

* * * * *